(No Model.) 2 Sheets—Sheet 2.
C. DENNIS & W. S. CLAWSON.
HAY OR HOG RACK.
No. 368,707. Patented Aug. 23, 1887.
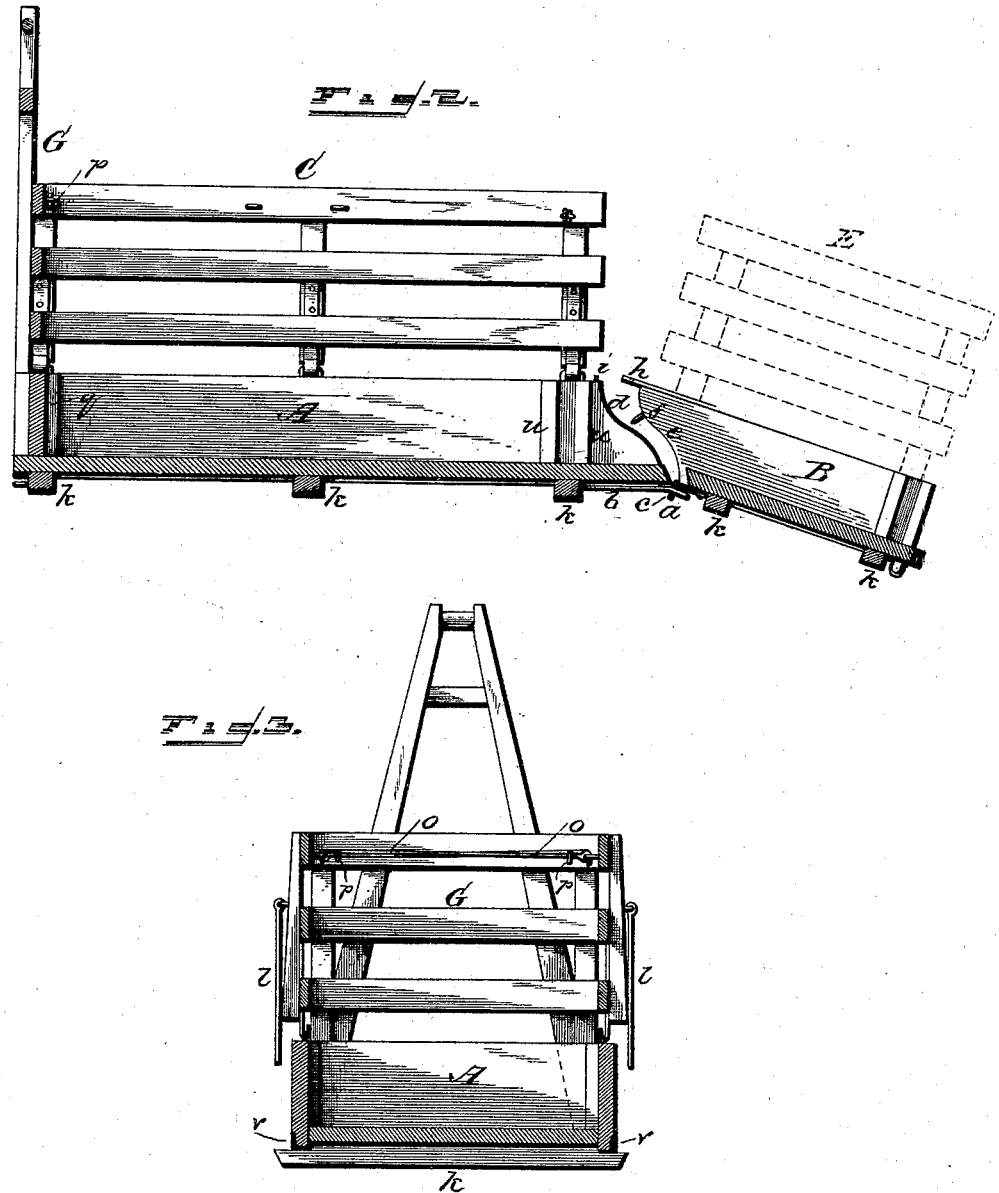
Witnesses
G. S. Elliott
L. L. Miller
Inventors
Charles Dennis
William S. Clawson
By their Attorney
Chas. H. Fowler

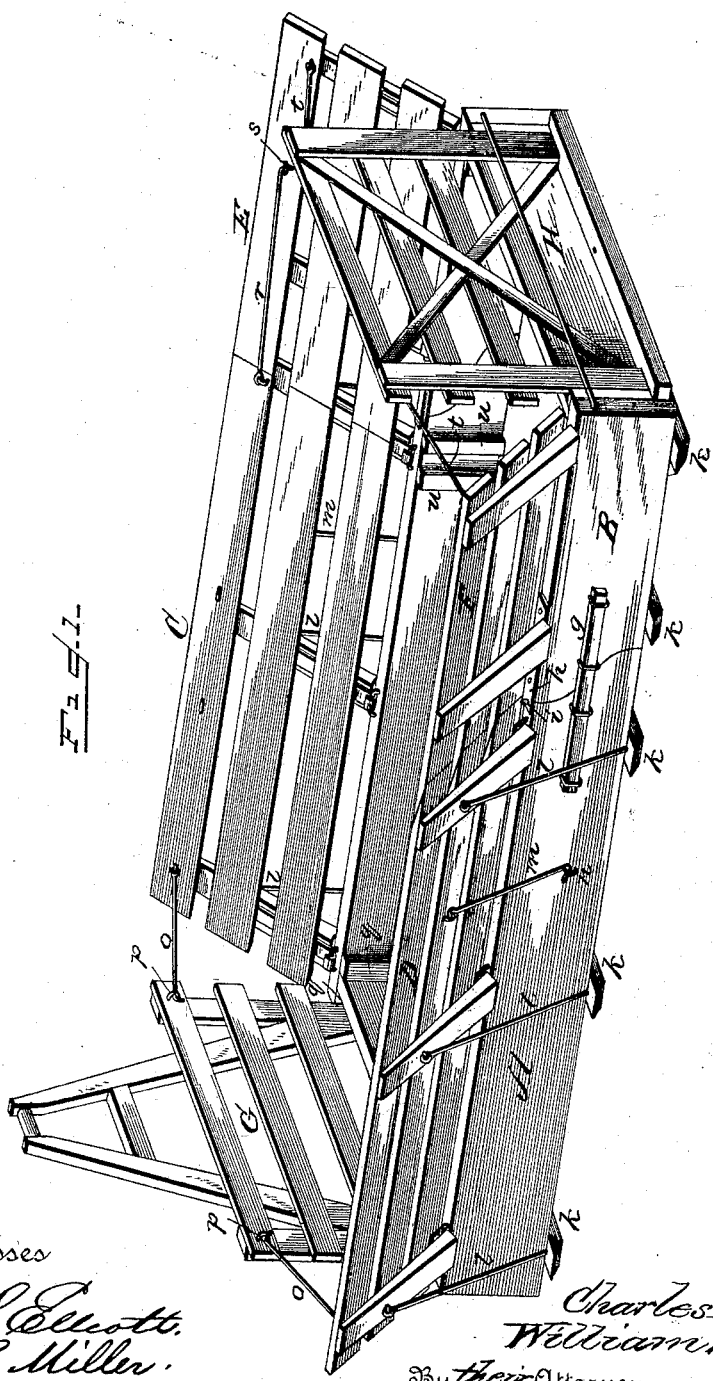

United States Patent Office.

CHARLES DENNIS AND WILLIAM S. CLAWSON, OF AUDUBON, IOWA.

HAY OR HOG RACK.

SPECIFICATION forming part of Letters Patent No. 368,707, dated August 23, 1887.

Application filed June 29, 1887. Serial No. 242,906. (No model.)

*To all whom it may concern:*

Be it known that we, CHARLES DENNIS and WILLIAM S. CLAWSON, citizens of the United States, residing at Audubon, in the county of Audubon and State of Iowa, have invented certain new and useful Improvements in Hog or Hay Racks; and we do hereby declare that the following is a full, clear, and exact description of the same, reference being had to the annexed drawings, making a part of this specification, and to the letters and figures of reference marked thereon.

Figure 1 of the drawings is a perspective view of our improved rack; Fig. 2, a longitudinal section showing the rear hinged end or platform lowered, and Fig. 3 a cross-section.

The present invention has for its object to provide a rack adapted for placing on the bed of a wagon, which may be used for containing hay, wood, or for other similar purposes, and, when desired, capable of being used for the transportation of hogs or sheep or other small animals; and the invention consists in the several details of construction, substantially as shown in the drawings, and hereinafter described and claimed.

The base or body of the rack consists of two sections, A B, the latter or rear section being suitably hinged, as shown at $a$, so as to enable it to be swung down at an angle, as shown in Fig. 2, for loading or unloading hogs or other stock, the same being used as an inclined platform for the stock to walk upon. In hinging the section B to the section A, I prefer to use eye-plates $b$, connected to the under side of the section A, and providing the section B with pin $c$ or hooks to engage with the eyes of the plates, thereby enabling the hinged section to be detached from its fastening when required. The meeting edges of the two sections A B are curved at their sides, as shown at $d$ $e$, respectively, and dowel-pins $f$ may be used to hold the sections securely together when on the same horizontal plane, bolts $g$ being used for holding the two sections stationary when in position, as shown in Fig. 1. The sections A B are further held together by means of eye-plates $h$, engaging with pins $i$, connected, respectively, to the sections B A.

We do not wish to be understood as limiting ourselves to any special form of hinge for connecting together the two sections A B, as any well-known hinge device may be substituted for that shown without departing from the spirit of our invention, and the sections are preferably provided upon their under side with transverse braces $k$.

The section A is provided with slatted sides C D, which are detachably hinged thereto in any well-known manner, so that they can be removed from the section or brought to an angle, as shown in Fig. 1, when used for the purpose of hauling hay or wood, and when used as a rack for hog or other stock to be brought to an upright position, as shown in Figs. 2 and 3. The section B has slatted sides E F, which are also detachably hinged to the section similar to the sections C D. When the sections C D are brought to an angle, as shown in Fig. 1, they are supported by stay-rods $l$, their lower ends resting upon the projecting end of the transverse braces $k$, and also by hooked rods $m$ at their sides engaging with staples $n$, and hooked rods $o$ engaging with staples $p$ at the slatted end G of the rack, the latter being held in position by cleats $q$ upon the inner sides of the section A. The sections E F are held to the sections C D by means of hooked rods $r$ engaging with staples $s$, and are supported at an angle by means of hooked rods $t$ engaging with staples on the rear slatted end, H, which is removable from the section B when the latter is brought to an angle, as shown in Fig. 2.

By removing the rear section, B, and securing the slatted end H between the cleats $u$, a short rack is provided suitable for use in and around feed-lots, and by removing the slatted sides and ends a wagon-box is provided that may be used for many purposes. When the rack is designed for use in the transportation of hogs or other stock, the slatted sides are brought to an upright position and held stationary by means of the hooked rods $o$ $t$ engaging with the staples that fasten said rod upon the opposite side, as shown more clearly in Fig. 3.

When hauling wood, the slatted sides, if preferred, may be brought to an upright position, having the same form of rack as when used for transporting hogs or other stock; or it may be used as shown in Fig. 1, as found most practicable.

By making the rack in two sections a short hay-rack or a long one may be provided, or a short or long rack for hauling stock, as many times a short rack is found more convenient, and when a long rack is found desirable, especially when used for the transportation of stock, the hinged section which forms the platform or chute for loading or unloading is considered of material importance, as it not only performs this office, but forms a part of the rack.

If preferred, sockets $v$ may be formed in the sides of the section A immediately above the transverse braces $k$, as shown in Fig. 3, so as to more conveniently hold the lower end of the rods $l$ in position.

When in use as a hay-rack, the hay is securely bound down by means of a rope, in the usual manner.

Having now fully described our invention, what we claim as new, and desire to secure by Letters Patent, is—

In a hay or other rack, the section A, provided with hinged slatted sides C D, detachably connected thereto and provided with stay-rods $l$, resting upon the transverse braces $k$, for supporting the slatted sides at an angle, and the removable slatted end G, in combination with the hinged section B, provided with hinged and removable slatted sides E F and slatted end H, and means for securely holding the slatted sides in an upright position or at an angle, substantially as and for the purpose set forth.

In testimony that we claim the above we have hereunto subscribed our names in the presence of two witnesses.

CHARLES DENNIS.
WILLIAM S. CLAWSON.

Witnesses:
H. U. FUNK,
J. B. DOAK.